United States Patent [19]

Putt et al.

[11] 4,022,112

[45] May 10, 1977

[54] FLOW THROUGH CAP FOR ATTENUATING ANY NOISE CAUSED BY AIR FLOW IN A PNEUMATIC SERVOMOTOR

[75] Inventors: James B. Putt; Harold H. Welsh, Jr., both of South Bend, Ind.

[73] Assignee: The Bendix Corporation, South Bend, Ind.

[22] Filed: Dec. 15, 1975

[21] Appl. No.: 640,363

[52] U.S. Cl. .............................. 91/376 R; 91/369 A; 181/36 D
[51] Int. Cl.² .................................... F15B 9/10
[58] Field of Search ......... 91/369 R, 369 A, 369 B, 91/376 R; 181/33 K, 71, 36 D

[56] References Cited

UNITED STATES PATENTS

| 3,026,852 | 3/1962 | Stelzer | 91/376 |
| 3,163,255 | 12/1964 | Stryker | 181/71 |
| 3,237,526 | 3/1966 | Hayes et al. | 91/376 |
| 3,727,516 | 4/1973 | Meyers et al. | 91/369 A |
| 3,897,716 | 8/1975 | Ramage et al. | 91/376 R |
| 3,921,501 | 11/1975 | Rosbock | 91/376 R |

Primary Examiner—Paul E. Maslousky
Attorney, Agent, or Firm—Leo H. McCormick, Jr.; William N. Antonis

[57] ABSTRACT

A muffler for absorbing the noise created by air flowing around a cylindrical body and into the interior thereof by maintaining a predetermined cross sectional area through which the air can freely flow.

8 Claims, 2 Drawing Figures

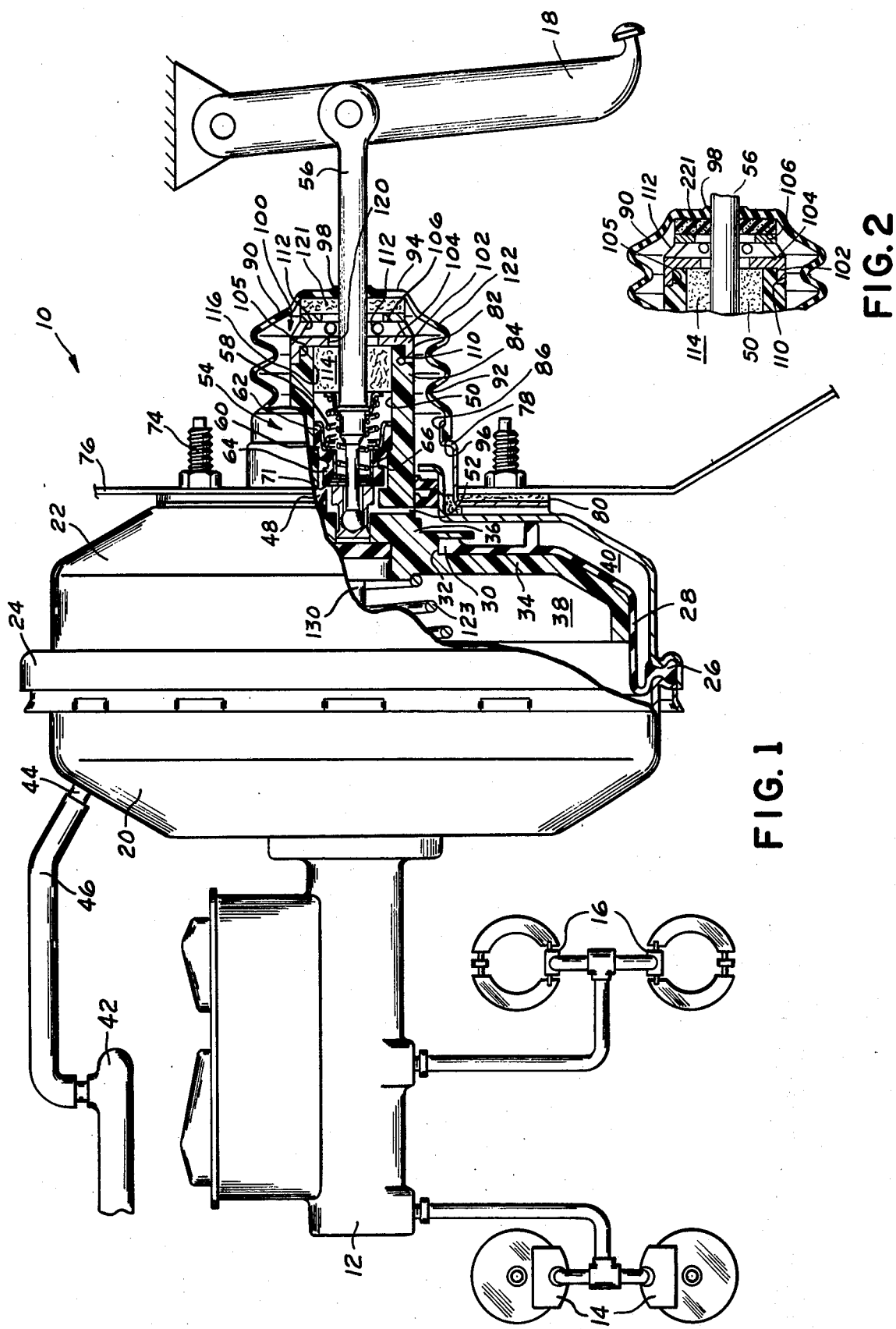

FLOW THROUGH CAP FOR ATTENUATING ANY NOISE CAUSED BY AIR FLOW IN A PNEUMATIC SERVOMOTOR

BACKGROUND OF THE INVENTION

Pneumatic servomotors such as disclosed in U.S. Pat. No. 3,106,873 are constructed in a manner such that air from the environment directly entered the rear chamber thereof by passing through the axial passageway in which the control valve is located. As air passed through the axial passageway into a vacuum evacuated rear chamber, a hissing noise can occur. This hissing sound does not affect the operational functioning of the servomotor but is annoying to some operators of a vehicle so equipped. However, it soon becomes evident that the operation of the control valve is affected by contaminants carried by the air. As a result a series of filters, such as shown in U.S. Pat. No. 3,289,547, were required to assure that only clean air was presented to the control valve. In addition, the filter, as disclosed in U.S. Pat. No. 3,897,716, reduced the air through the axial passageway to correspondingly reduce the hissing noise on normal brake application sufficiently that most operators do not hear or are not bothered by such operational noise.

However, some vehicle manufacturers as part of their sales and advertising procedure compare how quiet the passenger compartment is with respect to other vehicles. In an effort to further reduce the operational noise of a brake servomotor, it was suggested that the operational air be communicated from the engine compartment thereby eliminating the removal of air from the passenger compartment to operate the servomotor. In such servomotors, air is required to flow along the outside of the cylindrical housing of the hub and make a 180° turn around the end thereof before entering the axial passage to be presented to the control valve. Unfortunately, because of the rapid flow of air around the end of the cylindrical housing, it is possible to cause the dust boot to flutter and create an undesirable noise.

SUMMARY OF THE INVENTION

We have devised a muffler means for use in the flow path of the air to attenuate the noise created as the air is presented to the control valve. The muffler means has a cap means with a tubular body which is attached to the cylindrical projection of the hub means. The tubular body has a first shoulder which engages the end of the cylindrical projection and extends toward the center of the axial passageway of the cylindrical projection to provide a guide with which to maintain the operational input push rod in alignment with the control valve means. The tubular body has a second shoulder on the end thereof which forms a seat onto which a sound absorbing material is attached. A series of radial holes located between the first shoulder and the second shoulder provides a predetermined cross sectional area in which the air presented to the control valve can freely flow without interference from the dust boot. The absorbing material attenuates noise caused by air flowing through the control valve means and the second shoulder holds the closed end of the boot away from the radial holes sufficiently to prevent the air flow from causing a fluttering of the boot.

It is therefore the object of this invention to provide a pneumatically operated servomotor with a muffler means to attenuate any noise caused by the flow of air to the operational control valve.

It is a further object of this invention to provide a rearwardly projecting cylindrical hub means of a servomotor with a cap means which holds a boot away from a flow path through which air is communicated to a control valve means in the hub to prevent the air from making noise.

It is another object of this invention to provide a cap means for a cylindrical projection on a hub means with a series of radial openings to assure that a flow path is maintained at a predetermined cross sectional area thereby avoiding noise caused by air flowing through a restricted area.

It is another object of this invention to provide a servomotor with a silencer means which will attenuate operational noise without affecting the speed of actuation of the servomotor.

These and other objects becomes apparent from reading this specification and viewing the drawings.

BRIEF DESCRIPTION OF THE DRAWINGS

FIG. 1 shows a schematic view of a power brake system with a sectional view of a servomotor having a muffler means for attenuating noise created by the flow of an operational fluid to a control valve means therein.

FIG. 2 shows details of the muffler means including a foam rubber disc.

DETAILED DESCRIPTION OF THE PREFERRED EMBODIMENT

In the braking system shown in the drawing, a servomotor means 10 is connected to a master cylinder 12 which supplies the front wheel brakes 14 and the rear wheel brakes 16 with a hydraulic fluid under pressure in response to an actuation input force being applied to the foot pedal 18 by an operator.

The servomotor means 10 has a front shell 20 joined to a rear shell 22 by a twist lock means 24. The twist lock means 24 holds as external peripheral bead 26 of the diaphragm 28 while an internal peripheral bead 30 snaps into a groove 32 adjacent the wall 34 radiating from the hub means 36. The wall 34 and the diaphragm 28 separate the area between the front shell 20 and the rear shell 22 into a front chamber 38 and a rear chamber 40. The front chamber 38 is connected to a source of vacuum, such as an intake manifold 42, through check valve 44 in conduit 46. The front chamber 38 is connected to the rear chamber 40 through the interconnection of a first passage 48 which extends into an axial bore 50 to the rear chamber 40.

A control valve means 54 located in the axial bore 50 is positioned by a return spring 58 acting on push rod 56 to regulate the communication of vacuum from the first passage 48 into the axial bore 50. The control valve means 54 includes a poppet member 60 which has one end 62 secured to the hub means 36 and the other end 64 centrally located in the axial bore 50 by coil spring 66. In the released position, as shown in the drawing, the return spring 58 acts on the plunger 68 to move the atmospheric seat 71 thereon against the end 64 in opposition to the coil spring 66 to prevent the air in the environment from entering the second passage 52 through bore 50.

The rear shell 22 has a series of mounting studs 74 thereon which extend through the fire wall 76 of the vehicle. A retainer means 78 is located on the mounting studs and positioned between the rear shell 22 and the fire wall 76. The retainer has a series of ribs 80 thereon which allows air to flow to the peripheral surface 82 of the cylindrical body 84. The retainer has a groove 86 in a rearward projection which is concentric to the axial opening in the rear shell 22.

A boot means 90 has a central or sleeve section 92 with bellows thereon for surrounding the cylindrical body 84 and a closed end section 94. A bead 96 on the end of the sleeve section 92 snap into groove 86 while a lip 98 on the closed end section 94 engages push rod 56 to establish a closed flow path for air around cylindrical body 84.

A cap means 100 has a tubular member 102 which has a first shoulder 104 which projects inwardly toward the axial center of the push rod 56 and a second shoulder 106 adjacent the end thereof. The tubular section or member 102 is placed on a ledge 105 on the cylindrical body 84 until the first shoulder 104 engages the end 110 thereof. A series of openings 112 are located in the tubular section between the first shoulder 104 and the second shoulder 106 to allow air that is present in the flow path around the periphery of the cylindrical body 84 to be freely communicated to the interior of the axial bore 50. The diameter of the annular opening 120 of the first shoulder 104 is such that the push rod 56 is substantially maintained in axial alignment with the control valve means 54.

A filter 114 completely fills the axial bore 50 from the push rod 56 to the interior surface 116. Thus the control valve means 54 is presented with clean air to operate the servomotor.

A sound absorbing material such as closed cell foam rubber disc 221 shown in FIG. 2 or a felt material disc 121 as shown in FIG. 1 is attached to the second shoulder 106 on the cap means 100. The sound absorbing material acts as a barrier means to prevent the transmission of any noise which may occur when air flows into the axial bore within the cylindrical body 84. The thickness of the discs 121 and 221 are selected to hold the closed end 94 away from the second shoulder 106 sufficiently that the apex of the bellows 122 of the boot means 90 is approximately over the radial hose 112. This aids in directing the air flow which is required to make a 180° turn from along the peripheral surface 82 on the cylindrical body 84 to the interior axial bore 50.

MODE OF OPERATION OF THE PREFERRED EMBODIMENT

When an operator desires to stop the vehicle, an input force is applied to the brake pedal 18. This input force moves the push rod 56 which sequentially moves the plunger 68 and allows spring 66 to seat the end 64 of the poppet 60 on the vacuum seat 71. This interrupts vacuum communication between passage 48 and the axial bore 50. Further movement of the plunger 68 moves the atmospheric seat 71 away from the end 64 of the poppet 60 to allow air to enter the rear chamber 40 after flowing from the engine compartment of the vehicle after passing through rib section 80 into the area between the boot means 90 and the cylindrical body 84 through radial holes 112 to the axial bore 50. As air enters the rear chamber 40, a pressure differential is created across wall means 36 to provide push rod 130 with an operational force to operate the master cylinder 12 and supply the front wheel brakes 14 and the rear wheel brakes 116 with a pressurized force to achieve a desired level of braking. Upon termination of the input force on the pedal 18, the return spring 58 moves the plunger 68 into contact with poppet end 64 and thereby moves the end 64 away from seat 71 to permit the vacuum available in the front chamber 38 to evacuate the air from the rear chamber 40 and allow spring 123 to move the hub means 36 toward the rear shell to release the pressurizing force on the piston (not shown) in the master cylinder.

To evaluate the braking system for operational noise, an input force was applied to the brake pedal 18 which simulated a panic stop condition. Any noise which may have been created as the air was flowing into the rear chamber through the axial bore 50 was completely absorbed within the cylindrical body 84. Thus, it can readily be ascertained that the closed cell foam disc 221 or felt disc 121 retained any noise which may have been created in the reversing action of the air flowing to the control valve means 54.

We claim:

1. In a servomotor having a first shell joined to a second shell to form a closed chamber therein, the closed chamber being separated by a wall means to form a front chamber and a rear chamber, the wall means having a hub means with a cylindrical body which extends through an axial opening in the second shell, said cylindrical body having an axial passageway therethrough for communicating the front chamber with the rear chamber and the rear chamber with the atmosphere, said axial passageway retaining a control valve means for regulating the communication of air into the rear chamber in response to movement of a control rod by an operator for developing a pressure differential with vacuum in the front chamber to produce an output force, muffler means for attenuating the noise created as a result of air flowing into said axial passageway from the atmosphere, said muffler means comprising:

retainer means connected to said second shell and surrounding said axial opening, said retainer means having a plurality of ribs which engage said second shell to allow air to be presented to the peripheral surface of said cylindrical body;

boot means having a sleeve section which surrounds the cylindrical body and a closed end section, said sleeve section having a bead on the end thereof for engaging said retainer means, said closed end section having a lip on the end thereof for engaging the control rod, said boot means establishing a flow path along the peripheral surface of said cylindrical body;

cap means having a tubular member with a first shoulder thereon for engaging the cylindrical body and a second shoulder thereon for holding said closed end section of the boot means away from said axial passageway, said tubular member having a plurality of radial openings located between the first shoulder and the second shoulder to establish a fixed cross-sectional area for the flow path to assure that the air present along the peripheral surface can be freely communicated to said axial passageway; and acoustical barrier means located between said second shoulder and said closed end section of the boot means for absorbing noise caused by air inflowing to the control valve means by way of said radial openings in the cap means and the axial passageway.

2. The servomotor, as recited in claim 1, wherein said first shoulder of the tubular member extends radially inward to provide a guide for maintaining the control rod in axial alignment with the control valve means in the axial passageway.

3. The servomotor, as recited in claim 1, wherein said acoustical barrier means includes:
a disc made of a foam material.

4. The servomotor, as recited in claim 1, wherein said acoustical barrier means includes:
a disc made of a felt material.

5. In a servomotor having a hub means with a cylindrical body which extends through an opening in the servomotor housing, said cylindrical body having a passageway therethrough for retaining a control valve, said control valve being moved by a push rod to regulate the flow of air through said passageway to create an operational pressure differential in the servomotor, muffler means for attenuating any noise created by the flow of air through said passageway, said muffler means comprising:

retainer means connected to said housing and surrounding said opening, said retainer means having a series of ribs through which air is presented to the peripheral surface of said cylindrical body;

boot means having a sleeve section which surrounds the cylindrical body and a closed end section, said sleeve section engaging said retainer means and said closed end section engaging said push rod to establish a flow path along the peripheral surface of said cylindrical body;

cap means having a tubular member with a first shoulder thereon for engaging the cylindrical body and a second shoulder thereon for holding said closed end section of the boot means away from said passageway, said tubular member having a plurality of radial openings located between the first shoulder and the second shoulder to establish a fixed cross sectional area for the flow path to assure that the air present along the peripheral surface can be freely communicated to said passageway; and acoustical barrier means located between said second shoulder and said closed end section of the boot means for absorbing noise caused by air inflowing to the control valve means by way of said radial openings in the cap means and the passageway.

6. The servomotor, as recited in claim 5, wherein said first shoulder of the tubular member extends radially inward to provide a guide for maintaining the push rod in axial alignment with the control valve in the passageway.

7. The servomotor, as recited in claim 5, wherein said acoustical barrier means includes: a disc made of a foam material.

8. The servomotor, as recited in claim 5, wherein said acoustical barrier means includes:
a disc made of a felt material.

* * * * *